United States Patent
Izumi

(10) Patent No.: US 8,645,049 B2
(45) Date of Patent: Feb. 4, 2014

(54) CONTROL DEVICE FOR VEHICLE

(75) Inventor: Kazunari Izumi, Anjo (JP)

(73) Assignee: Denso Corporation, Kariya (JP)

( * ) Notice: Subject to any disclaimer, the term of this patent is extended or adjusted under 35 U.S.C. 154(b) by 812 days.

(21) Appl. No.: 12/862,035

(22) Filed: Aug. 24, 2010

(65) Prior Publication Data

US 2011/0049910 A1 Mar. 3, 2011

(30) Foreign Application Priority Data

Aug. 26, 2009 (JP) ................................. 2009-195216

(51) Int. Cl.
*F02N 11/08* (2006.01)
*B60W 20/00* (2006.01)
*B60W 10/20* (2006.01)

(52) U.S. Cl.
USPC ........................................ 701/113; 180/65.29

(58) Field of Classification Search
USPC ................. 701/113, 22, 102, 115; 180/65.21, 180/65.29; 290/38 R, 40 C, 40 R
See application file for complete search history.

(56) References Cited

U.S. PATENT DOCUMENTS

| | | | |
|---|---|---|---|
| 6,175,785 B1 | 1/2001 | Fujisawa et al. | |
| 6,608,394 B2 * | 8/2003 | Osada et al. | 290/31 |
| 6,630,810 B2 * | 10/2003 | Takemasa et al. | 320/104 |
| 8,039,976 B2 * | 10/2011 | Sato et al. | 290/40 C |
| 2002/0070555 A1 | 6/2002 | Osada et al. | |
| 2010/0120581 A1 * | 5/2010 | Mitsutani et al. | 477/7 |

FOREIGN PATENT DOCUMENTS

| | | | | |
|---|---|---|---|---|
| JP | P2003-70103 A | | 3/2003 | |
| JP | 2011031870 A | * | 2/2011 | B60W 10/26 |

OTHER PUBLICATIONS

Office Action (2 pages) dated Dec. 25, 2012 issued in corresponding Japanese Application No. 2009-195216 and English translation (3 pages).

* cited by examiner

*Primary Examiner* — Hieu T Vo
(74) *Attorney, Agent, or Firm* — Nixon & Vanderhye PC

(57) ABSTRACT

A motor generator is connected to a high voltage battery through an inverter. A voltage of the high voltage battery is decreased and is applied to a low voltage battery through a DC-DC converter. At time of starting an engine, a starting operation of a starter is executed by applying an output voltage of the DC-DC converter 36 to the starter. At this time, the output voltage of the DC-DC converter 36 may be adjusted based on the temperature of the engine, the voltage of the low voltage battery and/or the degree of degradation of lubricant oil of the engine.

8 Claims, 4 Drawing Sheets

FIG. 3A RUNNING ENABLING SWITCH
FIG. 3B ENGINE DRIVE REQUEST
FIG. 3C Vout
FIG. 3D CRANKING SIGNAL
FIG. 3E START DETERMINATION
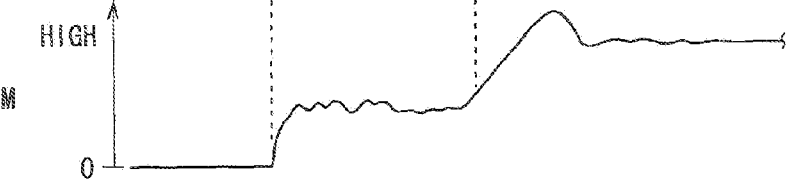
FIG. 3F ENGINE RPM

US 8,645,049 B2

CONTROL DEVICE FOR VEHICLE

CROSS REFERENCE TO RELATED APPLICATION

This application is based on and incorporates herein by reference Japanese Patent Application No. 2009-195216 filed on Aug. 26, 2009.

BACKGROUND OF THE INVENTION

1. Field of the Invention:

The present invention relates to a control device for a vehicle.

2. Description of Related Art:

For example, Japanese Unexamined Patent Publication No. 2002-161838A (corresponding to US2002/0070555A1) teaches a system of a vehicle, in which a low voltage battery and a high voltage are provided. The high voltage battery is used to drive an initial rotation applying means (starter) at the time of restarting an internal combustion engine in a state where the engine has been shut down through an idle stop mechanism after the vehicle is brought to a halt (for example, at traffic lights). By using the high voltage battery, the time required from the shutting down of the engine to the restarting of the engine can be shortened.

However, in the case of the above technique, the voltage, which is applicable to the starter, is limited by the high voltage battery. Therefore, there is no freedom with respect to the applied voltage. Furthermore, in the case where the low voltage battery is provided only for the purpose of restarting the engine, the number of the components is disadvantageously increased.

SUMMARY OF THE INVENTION

The present invention is made in view of the above disadvantages. According to the present embodiment, there is provided a control device for a vehicle, including an initial rotation applying means, a low voltage battery, a high voltage battery, a converter and an adjusting means. The initial rotation applying means is for applying initial rotation to an output shaft of an internal combustion engine of the vehicle. The low voltage battery is connected to the initial rotation applying means. The high voltage battery has a voltage higher than a voltage of the low voltage battery. The converter is adapted to decrease the voltage of the high voltage battery and applies the decreased voltage to the low voltage battery. The adjusting means is for adjusting a voltage, which is applied from the converter to the initial rotation applying means, through an operation of the converter at time of applying the initial rotation to the output shaft of the internal combustion engine.

BRIEF DESCRIPTION OF THE DRAWINGS

The invention, together with additional objectives, features and advantages thereof, will be best understood from the following description, the appended claims and the accompanying drawings in which:

FIGS. 3A to 3F are diagrams showing various parameters involved in the starting operation of the engine according to the first embodiment.

DETAILED DESCRIPTION OF THE INVENTION (First Embodiment)

A control device for a vehicle (more specifically, a parallel hybrid vehicle) according to a first embodiment of the present invention will be described with reference to the accompanying drawings.

Figure 1:
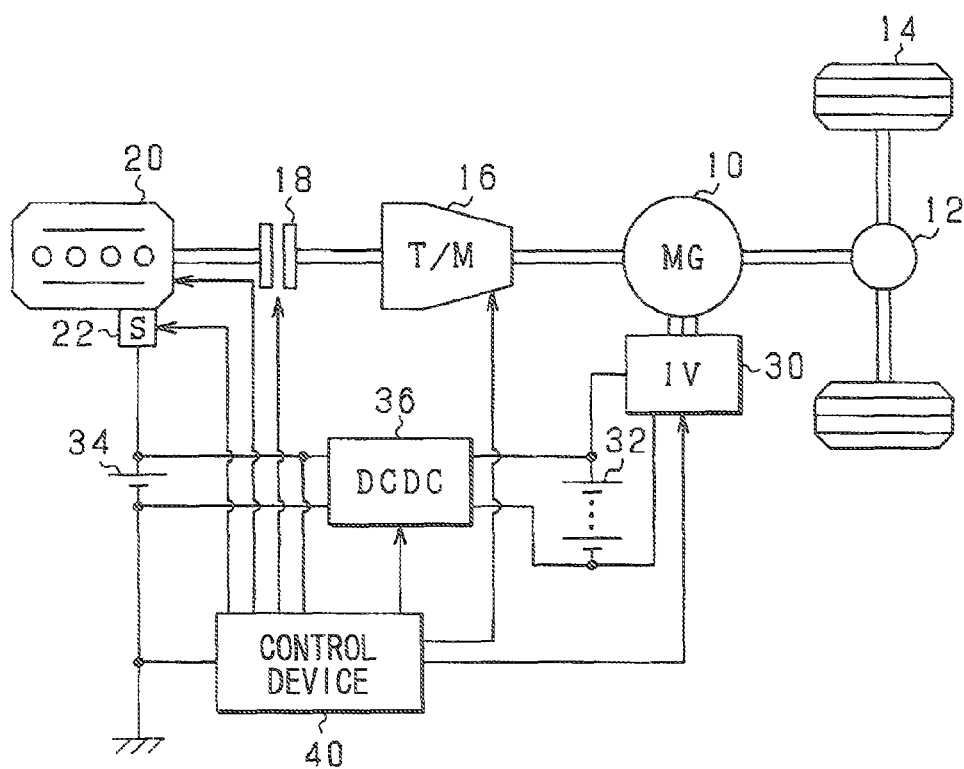
FIG. 1 is a system diagram according to a first embodiment of the present invention.

FIG. 1 is a diagram schematically showing the system of the present embodiment.

As shown in FIG. 1, a motor generator (rotating electrical machine) 10, which serves as an on-board propulsion apparatus, is mechanically connected to drive wheels 14 through a differential gear 12. The motor generator 10 is also mechanically connected to an internal combustion engine (hereinafter, simply referred to as an engine) 20, which serves as a vehicle propulsion apparatus, through a transmission 16 and a clutch 18. A starter (serving as an initial rotation applying means) 22, which provides a startup rotational force, is mechanically connected to a rotatable shaft (crank shaft) of the engine 20.

The motor generator 10 is connected to a high voltage battery 32 through an inverter (power conversion circuit) 30 to supply the electric power to or receive the electric power from the high voltage battery 32. A terminal voltage of the high voltage battery 32 reaches a predetermined high voltage (e.g., 100 V or higher). The starter 22 is powered from a low voltage battery 34, which has a voltage (about ten plus several volts) at its terminal lower than that of the high voltage battery 32.

The low voltage battery 34 forms an on-board low voltage system, a reference electric potential of which is of a vehicle body. The high voltage battery 32 forms an on-board high voltage system, which is electrically insulated from the on-board low voltage system. The electric power of the high voltage battery 32 can be supplied to the low voltage battery 34 through an isolated step-down converter (DC-DC converter 6).

The control device 40 controls the control amount of the on-board propulsion apparatus. Specifically, the control amount of the motor generator 10 is controlled through, for example, operation of the inverter 30. The control device 40 controls the operations of the clutch 18 and the DC-DC converter 36 and executes a start process, i.e., a starting operation of the starter 22. Here, at the time of starting the engine 20, the start process for starting the starter 22 is executed. The rotational speed of the starter 22 varies depending on the temperature of the engine 20 and the temperature of the low voltage battery 34. Specifically, when the temperature of the engine 20 is low, friction between a moving part of the engine 20 and a stationary part of the engine 20 becomes large to interfere with the rotation of the starter 22. Thereby, when the temperature of the engine 20 decreases, the rotational speed of the starter 22 decreases. Also, when the temperature of the low voltage battery 34 decreases, an internal resistance of the low voltage battery 34 increases, thereby resulting in a decrease in the terminal voltage. Thus, the voltage, which is applied to the starter 22, decreases. Therefore, when the temperature of the low voltage battery 34 decreases, the rotational speed of the starter 22 decreases.

In the case where the rotational speed of the starter 22 decreases, the startability of the engine 20 may possibly decrease. Therefore, according to the present embodiment, the voltage, which is applied to the starter 22, is generated through the DC-DC converter 36, so that the voltage, which is applied to the starter 22, can be variably set, i.e., can be adjusted. In this way, the rotational speed of the starter 22 can be controlled regardless of the environmental factors, such as the temperature.

Figure 2:
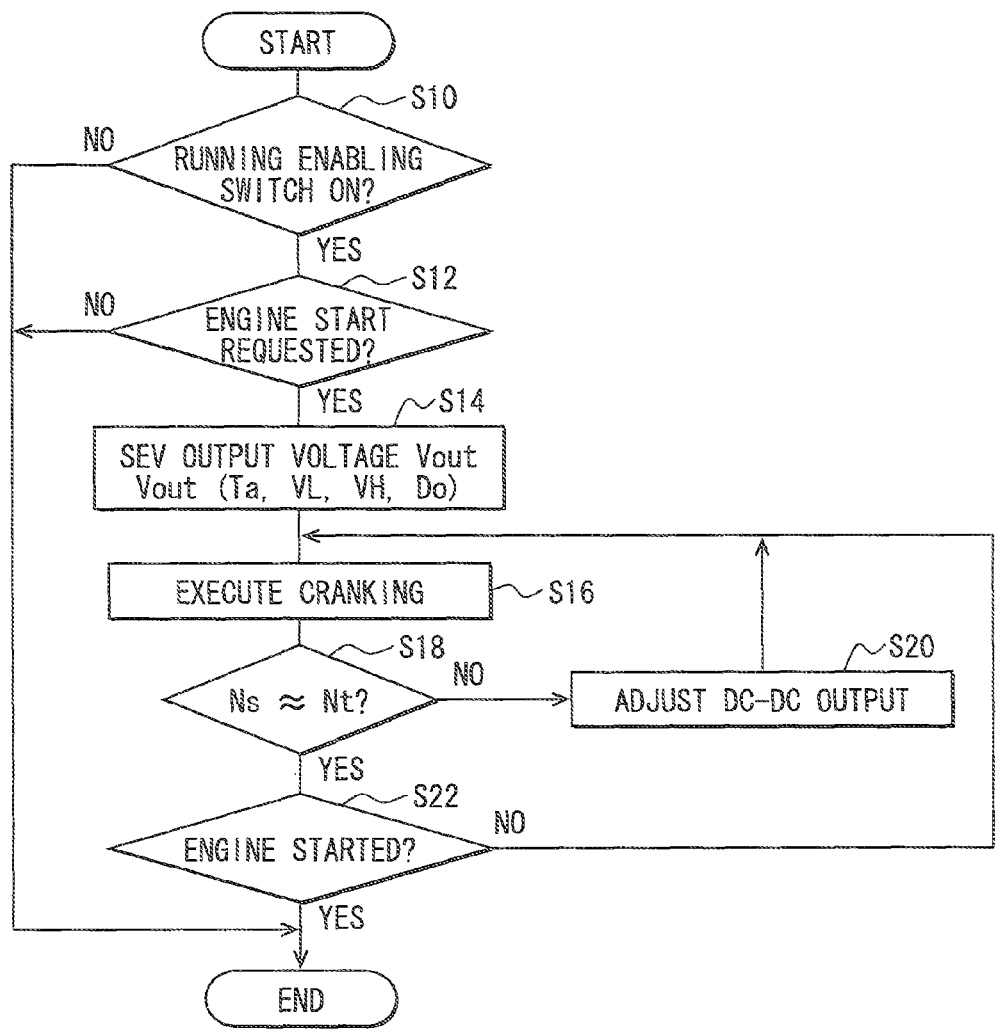
FIG. 2 is a flowchart showing a procedure of an engine starting operation according to the first embodiment.

FIG. 2 shows a procedure of the rotational speed control operation of the starter 22 in the starting operation of the engine 20 according to the present embodiment. The control device 40 executes this operation repeatedly at predetermined intervals.

In this operation, it is first determined whether a running enabling switch for enabling running, i.e., traveling of the vehicle is turned on. For instance, the running enabling switch may be a switch, which opens or closes, i.e., switches off or on a connection between the inverter 30 and the high voltage battery 32. When YES is returned at step S10, the operation proceeds to step S12. At step S12, it is determined whether a start request for starting the engine 20 exists. When it is determined that the start request for starting the engine 20 exists at step S12, the operation proceeds to step S14. At step S14, an output voltage Vout of the DC-DC converter 36 is set based on an outside temperature Ta, a voltage VL of the low voltage battery 34, a voltage VH of the high voltage battery 32 and a oil deterioration parameter Do.

The outside temperature Ta is a parameter, which correlates with the degree of friction at the engine 20. When the outside temperature Ta becomes low (and thereby when the temperature of the engine 20 becomes low), the degree of friction at the engine 20 becomes large. Therefore, when the outside temperature Ta becomes low (e.g., when the temperature of the engine 20 becomes lower than a predetermined temperature), the output voltage Vout of the DC-DC converter 36 is increased. The voltage VL of the low voltage battery 34 is a parameter, which indicates an amount current, which flows from the DC-DC converter 36 to the low voltage battery 34 as an output current of the DC-DC converter 36. That is, when the voltage VL of the low voltage battery 34 becomes low, the amount of electric current, which flows from the DC-DC converter 36 to the low voltage battery 34, is increased. Thereby, an amount of electric current, which flows to the starter 22, is decreased. Therefore, when the voltage of the low voltage battery 34 becomes low (e.g., becomes lower than a predetermined voltage), the output voltage Vout of the DC-DC converter 36 is increased. Furthermore, the voltage VH of the high voltage battery 32 is a parameter, which correlates with a remaining amount of charge (hereinafter referred to as a state of charge that is abbreviated as "SOC") of the high voltage battery 32. When the SOC becomes excessively low, it causes a trouble, such as an inoperable state of the motor generator 10. Therefore, when the voltage VH of the high voltage battery 32 becomes low, it is assumed that the SOC is low. Thus, in such a case (e.g., a case where the SOC is smaller than a predetermined amount or level), the output voltage Vout of the DC-DC converter 36 is decreased. In addition, when the lubricant oil of the engine 20 is deteriorated, the degree of friction is increased in the engine 20. Thus, when it is determined that the degree of deterioration of the lubricant oil is high based on the oil deterioration parameter Do (e.g., when it is determined that the degree of deterioration of the lubricant oil is higher than a predetermined degree), the output voltage of the DC-DC converter 36 is increased. The oil deterioration parameter Do may be one, which indicates that the degree of deterioration of the lubricant oil is high when a total operation time of the engine 20 since the time of replacing the lubricant oil is lengthened (e.g., when the total operation time of the engine 20 exceeds a predetermined time period).

Thereafter, at step S16, the cranking process is executed by starting the starter 22 to rotate the crankshaft of the engine 20 with the rotational force of the starter 22. Then, at step S18, it is determined whether the rotational speed Ns of the starter 22 generally coincides with a target rotational speed Nt of the starter 22. Here, the target rotational speed Nt is a rotational speed of the starter 22, which is achieved by supplying the voltage of the low voltage battery 34 to the starter 22 in the state where the terminal voltage of the low voltage battery 34 has the sufficient SOC under the normal temperature, and the degree of the friction is one that is obtainable under the normal temperature. When NO is returned at step S18, the rotational speed Ns of the starter 22 is feedback controlled to the target rotational speed Nt by adjusting the output voltage Vout of the DC-DC converter 36. It is assumed that the switching frequency of the DC-DC converter 36 is sufficiently high (e.g., the frequency being equal to or higher than 100 kHz) in comparison to an inverse number of a cranking time period (1 to 2 seconds). In this way, the feedback control of the output voltage Vout during the cranking period is possible.

The above-described steps S16, S18, S20 are executed until the engine 20 starts (until YES is returned at step S22, at which it is determined whether the engine 20 is started). Here, the starting of the engine refers to a state in which the crankshaft of the engine 20 is rotated by the energy generated by fuel combustion at the engine 20. Steps S14, S16, S18, S20 may serve as an adjusting means for adjusting the voltage applied from the converter 36 to the starter 22.

FIGS. 3A to 3F show the above described control operation for controlling the rotational speed of the starter 22. Specifically, FIG. 3A shows the change of the running enabling switch with time. FIG. 3B shows the change of the drive request for driving the engine 20 with time. FIG. 3C shows the change of the output voltage Vout of the DC-DC converter 36 with time. FIG. 3D shows the change of the start command signal (cranking signal) with time. FIG. 3E shows the change of result of the start determination with time. FIG. 3F shows the change of the rotational speed (engine rpm) of the engine 20 with time.

As shown in FIGS. 3A to 3F, when the drive request for driving the engine 20 is generated, the output voltage Vout of the DC-DC converter 36 is applied to the starter 22 to start the starter 22. Thereafter, the combustion control operation of the engine 20 is started, and thereby the operation of the starter 22 is terminated.

The present embodiment provides the following advantages.

(I) At the time of applying the initial rotation to the output shaft of the engine 20, the DC-DC converter 36 is operated to adjust the voltage, which is applied from the DC-DC converter 36 to the starter 22. In this way, in the starting operation of the engine 20, it is possible to avoid occurrence of the state where the rotational speed of the starter 22 becomes excessively low.

(II) In the case where the temperature of the engine 20 is low, the voltage, which is applied to the starter 22, is increased. In this way, it is possible to compensate a decrease in the rotational speed of the starter 22 caused by a decrease in the temperature of the engine 20.

(III) In the case where the voltage VL of the low voltage battery 34 is low, the voltage, which is applied to the starter 22, is increased. In this way, it is possible to compensate the decrease in the rotational speed of the starter 22 caused by the lowness of the voltage LV of the low voltage battery 34.

(IV) In the case where the SOC of the high voltage battery 32 is low, the voltage, which is applied to the starter 22, is decreased. In this way, it is possible to avoid the occurrence of the state where the SOC of the high voltage battery 32 is excessively low.

(V) In the case where the degree of deterioration of the lubricant oil at the engine 20 is high, the voltage, which is applied to the starter, is increased. In this way, it is possible to compensate the decrease in the rotational speed of the starter 22, which is caused by the deterioration of the lubricant oil.

(VI) The voltage, which is applied to the starter 22, is controlled to execute the feedback control of the rotational speed Ns of the starter 22. In this way, the rotational speed Ns of the starter 22 can be more accurately controlled.

(Second Embodiment)

A second embodiment of the present invention will be described mainly with respect to features, which are different from the first embodiment.

In the first embodiment, the voltage, which is applied to the starter 22, is variable, i.e., is adjustable. When the voltage of the starter 22 becomes high, the lifetime of the starter 22 may possibly be shortened. In the case where the voltage, which is applied to the starter 22, is adjusted with the DC-DC converter 36, the lifetime of the starter 22 may possibly differ from that of the case where the voltage, which is applied to the starter 22, is the voltage of the low voltage battery 34. Therefore, in the present embodiment, a lifetime predicting operation for predicting the lifetime (remaining lifetime) of the starter 22 is executed.

Figure 4:
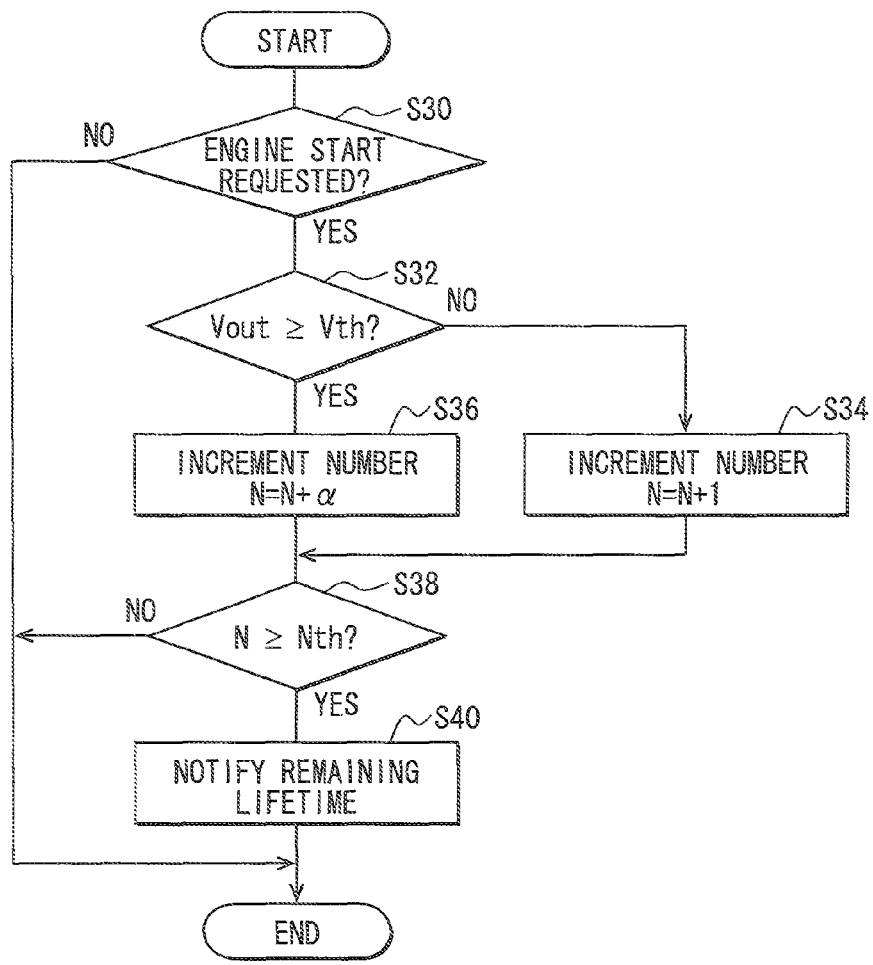
FIG. 4 is a flowchart showing a procedure of a lifetime predicting operation according to a second embodiment of the present invention.

FIG. 4 shows a procedure of the lifetime predicting operation for predicting the lifetime of the starter 22. The control device 40 executes this operation repeatedly at predetermined intervals.

In this operation, at step S30, it is first determined whether the start request for starting the engine 20 exists. When YES is returned at step S30, the operation proceeds to step S32. At step S32, it is determined whether the output voltage Vout of the DC-DC converter 36 is equal to or higher than a threshold voltage Vth. Here, the threshold voltage Vth is set to a value, which is higher than the terminal voltage of the low voltage battery 34 measured in the state where the SOC of the low voltage battery 34 is sufficient, and the temperature of the low voltage battery 34 is the normal temperature. When NO is returned at step S32, the number N of uses of the starter 22 is incremented by 1. The number N of uses of the starter 22 indicates how many times the starter 22 has been used. When YES is returned at step S32, the number N of uses of the starter 22 is incremented by α, which is larger than 1.

When step S34 or step S36 is completed, the operation proceeds to step S38. At step S38, it is determined whether the number N of uses of the starter 22 is equal to or higher than a threshold number Nth. This step is for predicting whether the starter 22 will become no longer operable in the near future. The threshold number Nth is set to be equal to or less than a possible number of times for the starter 22 to start again before the end of the lifetime of the starter 22 in the case where the starter 22 is started with the low voltage battery 34. When it is determined that the number N of uses of the starter 22 is equal to or higher than the threshold number Nth at step S38, the operation proceeds to step S40. At step S40, it is notified to a user that the starter 22 will become no longer operable in the near future.

When the operation ends at step S40 or when NO is returned at step S30 or step S38, the entire operation is terminated. Steps S30, S32, S34, S36, S38 and S40 may serve as a predicting means for predicting a remaining lifetime of the starter 22.

According to the present embodiment, in addition to the advantages (I) to (VI) of the first embodiment, the following advantage can be achieved.

(VII) The lifetime (the remaining lifetime) of the starter 22 is predicted based on the history of the amount of voltage every time the voltage is applied to the starter 22. In this way, even in the case where the voltage, which is applied to the starter 22, is adjusted, it is possible to know the remaining lifetime of the starter 22.

The above embodiments may be modified as follows.

In each of the above embodiments, the outside temperature Ta is used as the parameter, which correlates to the degree of friction in the engine 20 (the parameter, which correlates to the temperature of the engine 20). However, the present invention is not limited to this. For example, the outside temperature Ta may be replaced with other suitable temperature, such as the temperature of the coolant of the engine 20 or the temperature of the lubricant oil of the engine 20.

The input parameters, which are used to adjust the output voltage Vout of the DC-DC converter 36, are not limited to include all of the parameter (the outside temperature Ta) relating with the degree of friction in the engine 20, the voltage VL of the low voltage battery 34, the voltage VH of the high voltage battery 32 and the oil deterioration parameter Do. That is, the input parameter(s) may include only one of them (or at least one of them), if desired.

Furthermore, the output voltage Vout may not be adjusted based on these input parameters.

In each of the above embodiments, the output voltage Vout of the DC-DC converter 36 is adjusted to execute the feedback control of the rotational speed Ns of the starter 22 to the target rotational speed Nt. For example, the output voltage Vout may be adjusted to execute the feedback control of the rotational speed Ns equal to or above the target rotational speed Nt. In other words, in the case where the rotational speed Ns of the starter 22 is equal to or higher than the target rotational speed Nt, it is not required to decrease the output voltage Vout of the DC-DC converter 36.

In the second embodiment, when the output voltage Vout of the DC-DC converter 36 is increased beyond the threshold value Vth, the number N of uses of the starter 22 is incremented by α, which is larger than 1. However, the present invention is not limited to this. For example, the number of uses of the starter 22 may be set stepwise through two or more steps according to the output voltage Vout or may be set continuously according to the output voltage Vout. Furthermore, the number of uses of the starter 22 may be determined based on a time period, during which the output voltage Vout is applied, in addition to the output voltage Vout.

In the second embodiment, when the remaining lifetime of the starter 22 is short, it is notified. However, the present invention is not limited to this. For instance, a percentage of the remaining lifetime relative to the total expected lifetime may be alternatively notified to the user.

In each of the above embodiments, the output voltage Vout of the DC-DC converter 36 is adjusted to limit the excessive decrease of the rotational speed of the starter 22. However, the present invention is not limited to this. For example, the output voltage Vout of the DC-DC converter 36 may be adjusted such that the actual rotational speed of the starter 22 is maintained at a higher rotational speed, which is higher than the rotational speed of the starter 22 that can be achieved in the state where the SOC of the low voltage battery 34 is sufficient, and the temperature is under the normal temperature.

The hybrid vehicle is not limited to the parallel hybrid vehicle. For example, the hybrid vehicle may be a seriesparallel hybrid vehicle, in which the engine 20, the motor generator 10 and the drive wheels 14 are mechanically coupled to a power-split apparatus. Even in such a case, the present invention can be effectively applied as long as the engine 20 is started with the starter 22, to which the output voltage Vout of the DC-DC converter 36 is applied.

Additional advantages and modifications will readily occur to those skilled in the art. The invention in its broader terms is therefore not limited to the specific details, representative apparatus, and illustrative examples shown and described.

What is claimed is:

1. A control device for a vehicle, comprising:
   an initial rotation applying means for applying initial rotation to an output shaft of an internal combustion engine of the vehicle;
   a low voltage battery that is connected to the initial rotation applying means;
   a high voltage battery that has a voltage higher than a voltage of the low voltage battery;
   a converter that is adapted to decrease the voltage of the high voltage battery and applies the decreased voltage to the low voltage battery; and
   an adjusting means for adjusting a voltage, which is applied from the converter to the initial rotation applying means, through an operation of the converter at time of applying the initial rotation to the output shaft of the internal combustion engine.

2. The control device according to claim 1, wherein the adjusting means increases the voltage, which is applied from the converter to the initial rotation applying means, when a temperature of the internal combustion engine is lower than a predetermined temperature.

3. The control device according to claim 1, wherein the adjusting means increases the voltage, which is applied from the converter to the initial rotation applying means, when the voltage of the low voltage battery is lower than a predetermined voltage.

4. The control device according to claim 1, wherein the adjusting means decreases the voltage, which is applied from the converter to the initial rotation applying means, when a remaining amount of charge at the high voltage battery is smaller than a predetermined amount.

5. The control device according to claim 1, wherein the adjusting means increases the voltage, which is applied from the converter to the initial rotation applying means, when a degree of deterioration of lubricant oil of the internal combustion engine is higher than a predetermined degree.

6. The control device according to claim 1, wherein the adjusting means adjusts the voltage, which is applied from the converter to the initial rotation applying means, to execute feedback control of a rotational speed of the initial rotation applying means.

7. The control device according to claim 1, further comprising a predicting means for predicting a remaining lifetime of the initial rotation applying means based on a history of an amount of voltage applied to the initial rotation applying means at time of starting the internal combustion engine.

8. The control device according to claim 1, wherein:
   the vehicle further includes a rotating electrical machine as a propulsion apparatus in addition to the internal combustion engine; and
   the high voltage battery is connected to the rotating electrical machine through a power conversion circuit.

* * * * *